(12) United States Patent
Steinmark et al.

(10) Patent No.: US 12,390,984 B1
(45) Date of Patent: Aug. 19, 2025

(54) 3D PRINTER

(71) Applicant: U.S. Gov. as Rep'd by the Secretary of the Army, Picatinny Arsenal, NJ (US)

(72) Inventors: Adam Steinmark, Flanders, NJ (US); Ralph Tillinghast, Hardwick, NJ (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 82 days.

(21) Appl. No.: 18/179,082

(22) Filed: Mar. 6, 2023

Related U.S. Application Data

(60) Provisional application No. 63/317,350, filed on Mar. 7, 2022.

(51) Int. Cl.
| | |
|---|---|
| *B29C 64/232* | (2017.01) |
| *B29C 64/118* | (2017.01) |
| *B29C 64/236* | (2017.01) |
| *B29C 64/329* | (2017.01) |
| *B33Y 10/00* | (2015.01) |
| *B33Y 30/00* | (2015.01) |
| *B33Y 70/00* | (2020.01) |

(52) U.S. Cl.
CPC .......... *B29C 64/118* (2017.08); *B29C 64/232* (2017.08); *B29C 64/236* (2017.08); *B29C 64/329* (2017.08); *B33Y 10/00* (2014.12); *B33Y 30/00* (2014.12); *B33Y 70/00* (2014.12)

(58) Field of Classification Search
CPC .................................................. B29C 64/232
See application file for complete search history.

(56) References Cited

U.S. PATENT DOCUMENTS

| | | | | |
|---|---|---|---|---|
| 5,287,435 | A | * | 2/1994 | Cohen ................... B33Y 30/00 425/162 |
| 7,052,261 | B2 | * | 5/2006 | Fernandez ........... A63H 33/001 425/173 |
| 7,182,902 | B2 | * | 2/2007 | Cziraky ................. B43K 19/16 425/173 |
| 9,481,133 | B2 | | 11/2016 | Carbone |
| 9,566,744 | B1 | * | 2/2017 | Carbone ............... B29C 64/106 |
| 10,688,523 | B2 | * | 6/2020 | Skinner ............. B05C 17/00523 |

(Continued)

OTHER PUBLICATIONS

Solidscape, www.solidscape.com/3d-printing-materials/wax/, Retreived Aug. 8, 2023.

(Continued)

*Primary Examiner* — Andrew D Graham
(74) *Attorney, Agent, or Firm* — John P. DiScala

(57) ABSTRACT

A simplified, gearless, passive z-axis 3d printer system is suitable for an elementary school which uses a slotted cam to convert x and y axis movement of the print head to adjust the z axis. More specifically, a low temperature 3d printer may use consumer crayons as the build material. The 3d printer system is designed such that it may be constructed of parts which may be 3d printed. The 3d printer system may further include a means of reclaiming and recasting the build material for reuse. The 3D printer system, and the reclaiming and recasting means may be part of a overall cyclic learning process. The 3D printer may be part of an overall learning process which may further include scanning and converting a 2D drawing to 3D format.

4 Claims, 13 Drawing Sheets

(56) References Cited

U.S. PATENT DOCUMENTS

| | | | | |
|---|---|---|---|---|
| 2001/0030383 | A1* | 10/2001 | Swanson | B29C 64/106 242/570 |
| 2003/0032214 | A1* | 2/2003 | Huang | B29C 64/112 264/435 |
| 2009/0314391 | A1* | 12/2009 | Crump | B33Y 10/00 164/94 |
| 2010/0100222 | A1* | 4/2010 | Skubic | B29C 64/245 700/110 |
| 2010/0212584 | A1* | 8/2010 | Ederer | B29C 64/165 118/56 |
| 2013/0095302 | A1* | 4/2013 | Pettis | B32B 3/10 118/698 |
| 2013/0189435 | A1* | 7/2013 | Mackie | B33Y 30/00 427/256 |
| 2015/0140147 | A1* | 5/2015 | Konstantinos | B29C 64/241 425/174 |
| 2015/0144284 | A1* | 5/2015 | Snyder | B22D 17/2209 164/253 |
| 2015/0147424 | A1* | 5/2015 | Bibas | B33Y 30/00 425/150 |
| 2015/0352789 | A1* | 12/2015 | Haider | B33Y 30/00 264/129 |
| 2016/0185039 | A1* | 6/2016 | Carbone | B29C 64/106 425/375 |
| 2016/0229121 | A1* | 8/2016 | Ilic et al. | B29C 64/232 |
| 2016/0236407 | A1* | 8/2016 | Armani | B29C 64/118 |
| 2016/0325505 | A1* | 11/2016 | Ou | B29C 64/393 |
| 2017/0173871 | A1* | 6/2017 | Ermoshkin | B29C 64/393 |
| 2018/0272379 | A1* | 9/2018 | Skinner | B43K 19/00 |
| 2018/0304533 | A1* | 10/2018 | Burnham | B29C 64/209 |
| 2019/0240730 | A1* | 8/2019 | Haider | B33Y 30/00 |
| 2020/0061911 | A1* | 2/2020 | Kettelarij | B29C 64/232 |
| 2020/0086566 | A1* | 3/2020 | Goodman | B29C 64/232 |
| 2020/0254688 | A1* | 8/2020 | Whitehead | B22F 12/00 |

OTHER PUBLICATIONS

Filaments.ca, PCL low temperature filament, filaments.ca/products/pcl-low-temperature-filament-black-2-85mm , Retrieved Aug. 8, 2023, Canada.

Cracycle, My Fruit Shack, www.toyscentral.eu/products/cracycle-diy-4-giant-crayons-craft-project-gift-maker-2-silicone-molds-complete-accessories-to-make-4-giant-crayons-in-a-giant-crayon-box-reusable , Retrieved Aug. 8, 2023.

Moyer, Ilan E., Core(X,Y) theory, www.corexy.com/theory.html , 2012.

* cited by examiner ness for use in a classroom environment. While the size and cost of a microwave make it unsuitable to describe as having been entirely "3D printed" for a few hundred dollars, a part of the remelter/recycler that contains the mold and water may be 3D printed.

3D PRINTER

CROSS-REFERENCE TO RELATED APPLICATIONS

This application claims the benefit under 35 USC § 119(e) of U.S. provisional patent application 63/317,350 filed on Mar. 7, 2022.

U.S. GOVERNMENT INTEREST

The inventions described herein may be made, used, or licensed by or for the U.S. Government for U.S. Government purposes.

BACKGROUND

There exists a need for a 3D printer which may operate at a low temperature, suitably safe for an elementary school classroom environment. Further such a 3d printer should be economical regarding both its construction and the build material it uses. Additionally it is advantageous that a substantial portion of the elements of the 3d printer may themselves be 3D printed using a consumer 3D printer using nearly any non-elastomer thermoplastic While passive z-axis systems exist which may be used with 3d printers, such as in U.S. Pat. Nos. 9,566,744 and 9,481,133 to Carbone et al, they utilize a system of gears to use x or y axis motion to actuate the z axis. The elements of such geared systems suitable to these designs are difficult to manufacture using consumer level 3D printers. The method of using gears requires a rack, pinion, worm, another pinion, and another rack. While the gears allow precision and control through customization of pitch or number of teeth, there are downsides to this approach.

U.S. Pat. No. 10,688,523B2 to Skinner discloses a crayon wax applicator 'pen' or Solid marking material melting applicator wand which uses crayons as the material which melt and is applied to, for instance, paper. While the patent notes a 3d effect may be achieved with successive applications of the crayon wax from the 'pen', the essentially ball point pen nature of the 'pen' preclude the volume deposition required for 3d additive manufacturing or printing.

There are 3d printers which use build material which is in the general size and shape of consumer crayons, such as the Solidscape Midas material. While the pieces of material are referred to by as "crayons", they have a high melt temperature (~120 C), and as such are less safe than ideal for a classroom 3d printer.

There are consumer crayon recyclers and remolders such as CraCycle which use microwave, but which microwave the crayon directly without the water vessel.

Other crayon recyclers designed to be used by children, such as those described in U.S. Pat. No. 7,052,261 to Fernandez et al, and U.S. Pat. No. 7,182,902 to Cziraky differ in operation and may have internal parts which become hotter than is ideally touch safe for children. Generally, 3d printers that are marketed as 'low temperature', have melt temperatures which are higher than may cause burns with even brief skin contact.

PCL Low temperature filament 3D printers may operate at temperatures approximately child safe, however they lack the ability to operate with feedstock readily available in the classroom environment such as classroom crayons and which feedstock may be recycled for further use.

SUMMARY OF INVENTION

A child-safe, low temperature 3D printer system has a 3D printable slotted cam passive Z-axis alignment system, a print head heater which may be a helical coil for rapid, uniform, but low temperature heating of the build material, and optionally, a reclaimation/recycling mold system for recasting build material.

The 3D printer is designed to use wax such as jumbo crayons as consumables instead of standard thermoplastic filament and by doing so it operates at low enough temperatures that it's suitable to be around children. The 3D printer provided is designed so that may be completely 3D printed out of standard thermoplastics except for essential components (motors, belts, hardware, electronics, heater block, and nozzle) and only costing roughly $100 in materials to produce which is considerably lower than other 3D printers.

An advantageous feature is the actuation method of the Z axis. 3D printers generally use at least three motors to move throughout the XYZ coordinate system; the Picatinny Arsenal Crayon printer for Kids (PACK) uses only two motors for X and Y motion. The Z axis is actuated not with a motor, but by the tool-head. This is achieved by means of a slotted cam which has a plurality of slots arranged radially about its circumference, and which slotted cam is attached to a lead screw. There is a Z-actuator pin attached the the tool head. The tool head and Z-actuator pin may be made to move in the XY axis into a position such that the Z-actuator pin engages one of the plurality of slots on the slotted cam. As the tool head and Z-actuator pin are moved in the XY axis to trace a circle with the Z-actuator pin, the pin turns the slotted cam. Rotation of the slotted cam turns the attached lead screw, which is threaded into the buildplate, which is slidably attached to the Z frame so that it may generally only translate in the z axis. The turning of the lead screw raises and lowers the build plate in the z axis. This arrangement has the additional advantage of being substantially 3D printable.

The print head nozzle may contain the heater to melt the build material which may be crayon wax. A means to rapidly and uniformly heat the build material is provided in the form of a heating coil which surrounds the build material to provide uniform heating. The heating coil may take the form of nichrome wire. The print head may have a heater block within, which may take the form of a cylinder which surrounds and may be in direct contact with the build material, and which uniformly transmits heat from the heating coil to the build material. The heating coil may be arranged helically between the outer surface of the heater block and an interior surface of the print head nozzle. In one embodiment, there may be a helical channel or threads in an interior surface of the print head nozzle and the coil may be arranged in this channel before insertion of the heater block. A threaded tool is provided to facilitate such an assembly method. A heater of a wire coil type may be a helically arranged coil of nichrome wire to more uniformly heat comparatively large diameter jumbo crayon feedstock, and reduce the time for the system to thermally stabilize.

A build material remelter/recycler is provided which allows for recasting of build material into a crayon like shape for reuse in the 3D printer using, for instance, a microwave as a heat source, and further providing for the mold to be surrounded by a water vessel to aid in uniform microwave energy transfer. A mold to form a substantially crayon shaped item may be substantially cylindrical and may be oriented axially vertically, with an opening at the top. There may be, extending from the top of the mold, a funnel shaped structure which may receive pieces of wax to be recast and which may channel the wax into the mold as it melts. The mold may be contained within a vessel which may be suitable to receive water. The mold may, advantageously be divided along its length in 2 or more pieces to allow for easy removal of the reformed wax crayon.

It is envisioned that the low temperature 3D printer system and remelter may be combined with a classroom computer with 3D modeling software to provide an overall classroom safe system and process for developing 3D models and printing them with readily available low melt temperature crayon wax, and allowing for reclaimation of build material for possible reuse. Additionally the process may include scanning of a student's drawing and converting that drawing into a 3D model for printing.

The benefit of this 3D printer is that it can be used by young children, specifically kindergartners. 3D printers in schools have been limited to middle schools and high schools due to the nature of the machines, mostly the temperatures at which they operate. Standard 3D printers are designed to operate at anywhere from 190-300 degrees Celsius but the PACK is designed to operate at roughly 55 degrees Celsius. This allows the components to stay at safe temperatures, should a child interfere with the machine they will not be burned. The low cost of the PACK allows it to be integrated into almost any classroom without a large expense. Most desktop 3D printers cost anywhere from a few hundred to a few thousand dollars and the consumable materials can be expensive as well. Even the few 3D printers that are similarly priced to the PACK are not able to process the low temperature wax material. The PACK is designed to consume wax such as jumbo crayons which is readily available in most classrooms. This machine will give children the opportunity to get involved with 3D design, 3D printing, and STEM at a young age.

LIST OF DRAWINGS

Figure 8:
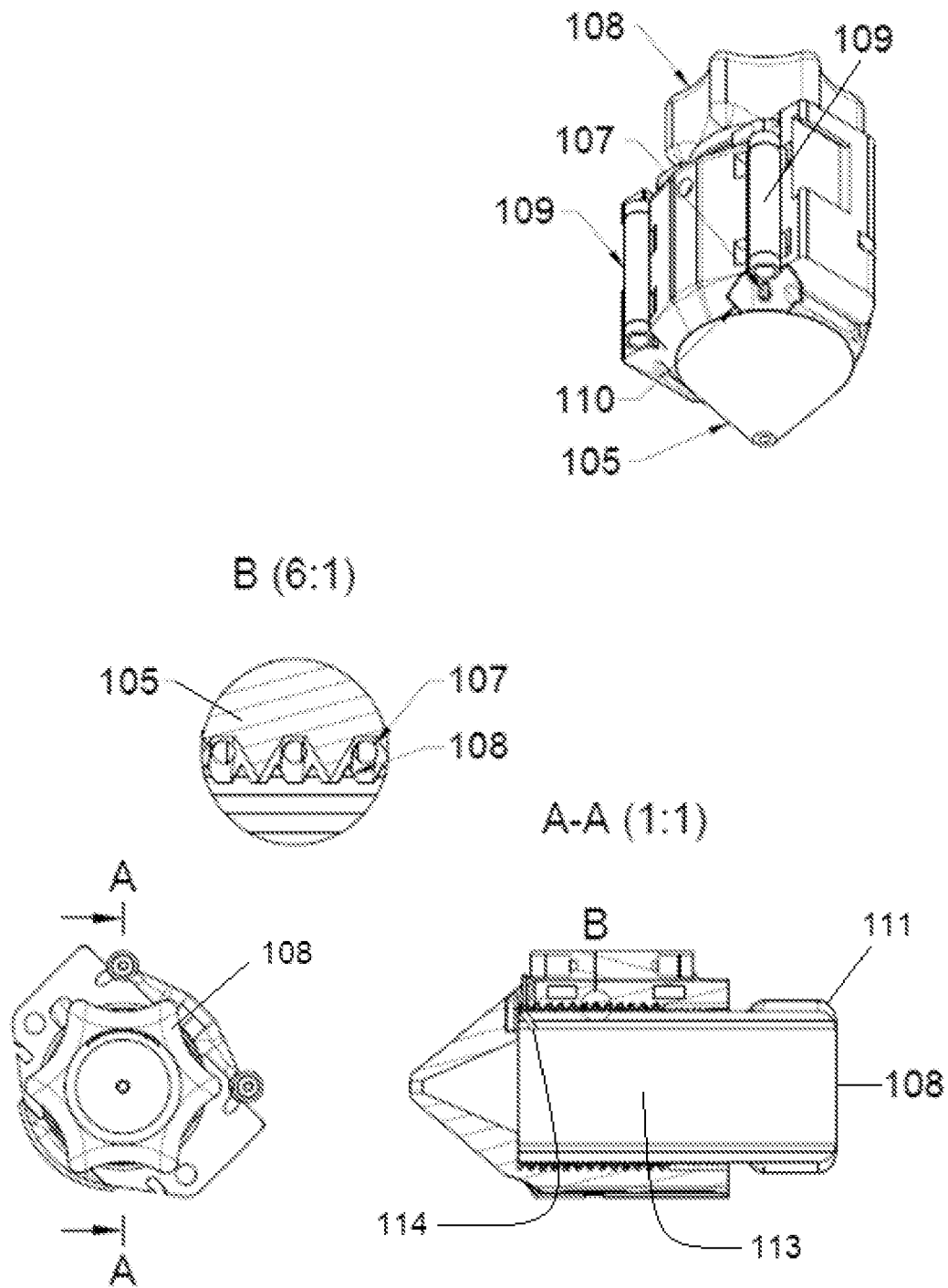

FIG. 8 depicts the use of the threading tool in the threaded nozzle after it has been used to thread the nichrome wire heater into the nozzle threads according to an illustrative embodiment. The section view shows how the threading tool integrates with the internal body of the nozzle and a detailed view shows a closer look about how the nichrome wire sits between the tool and housing of the nozzle according to an illustrative embodiment.

Figure 9:
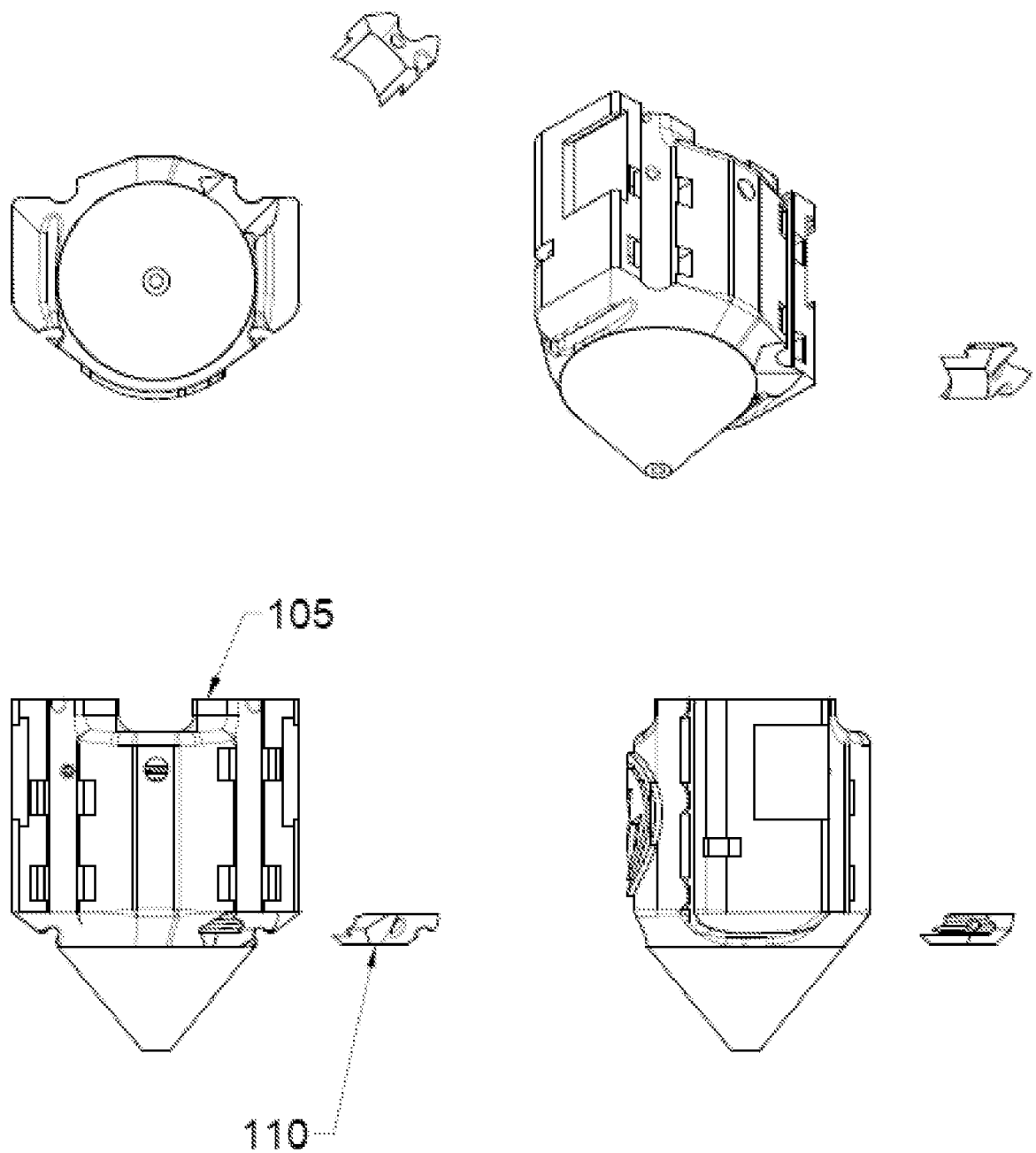

FIG. 9 depicts the views of the nozzle and the nozzle insert according to an illustrative embodiment.

Figure 10:
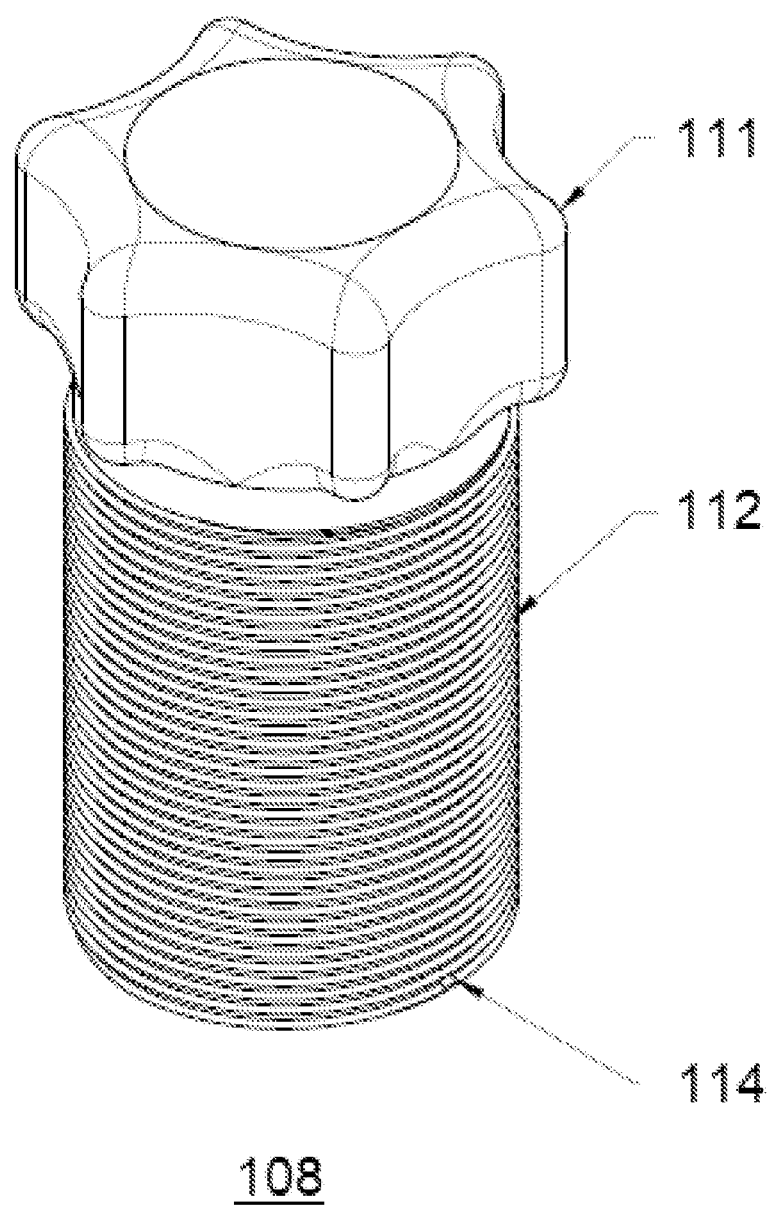

FIG. 10 depicts an embodiment of the threading tool according to an illustrative embodiment.

Figure 11:
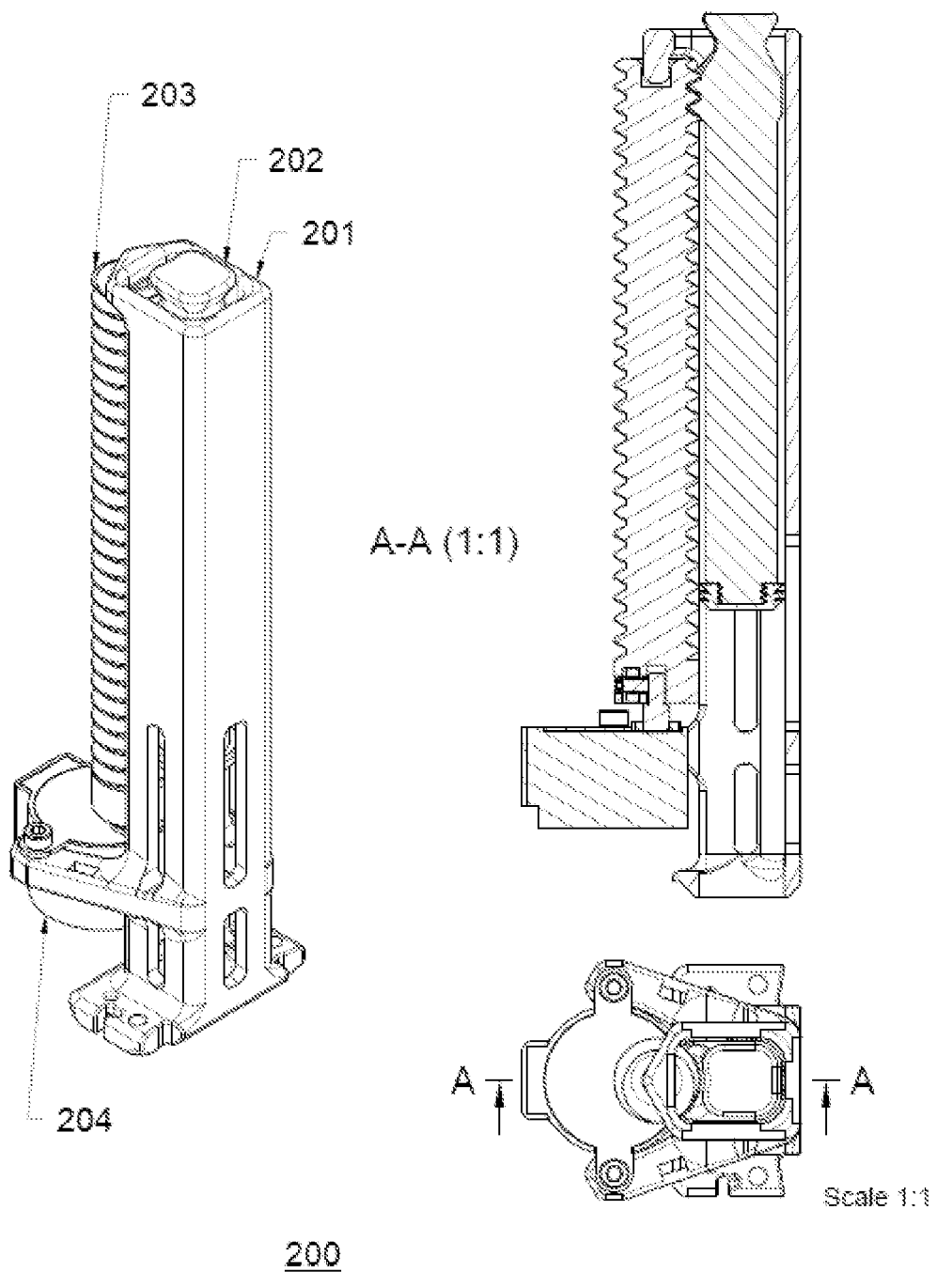

FIG. 11 a ¾ view and cutaway of the extruder according to an illustrative embodiment.

Figure 12:
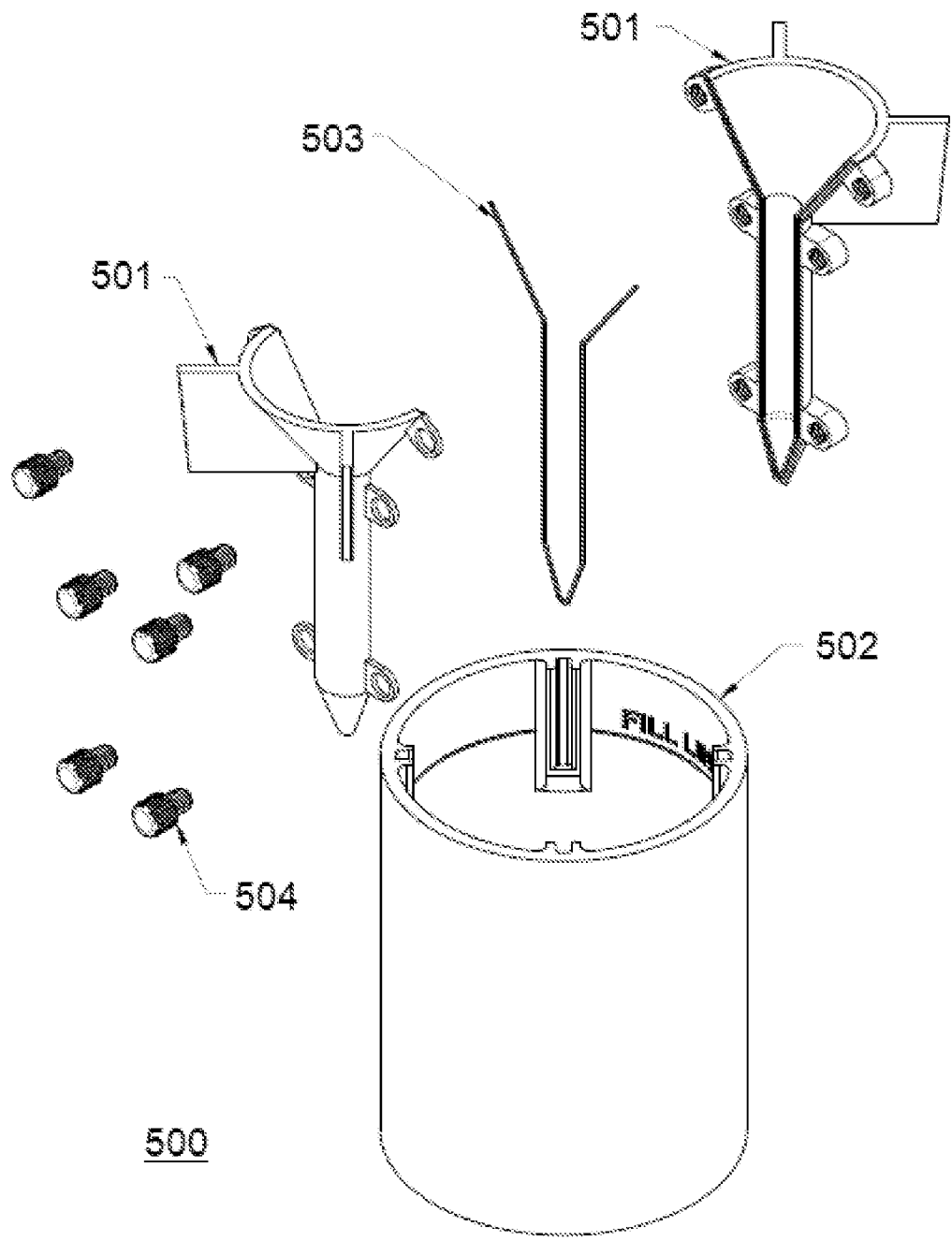

FIG. 12 depicts a possible remelter/recycler according to an illustrative embodiment.

Figure 13:
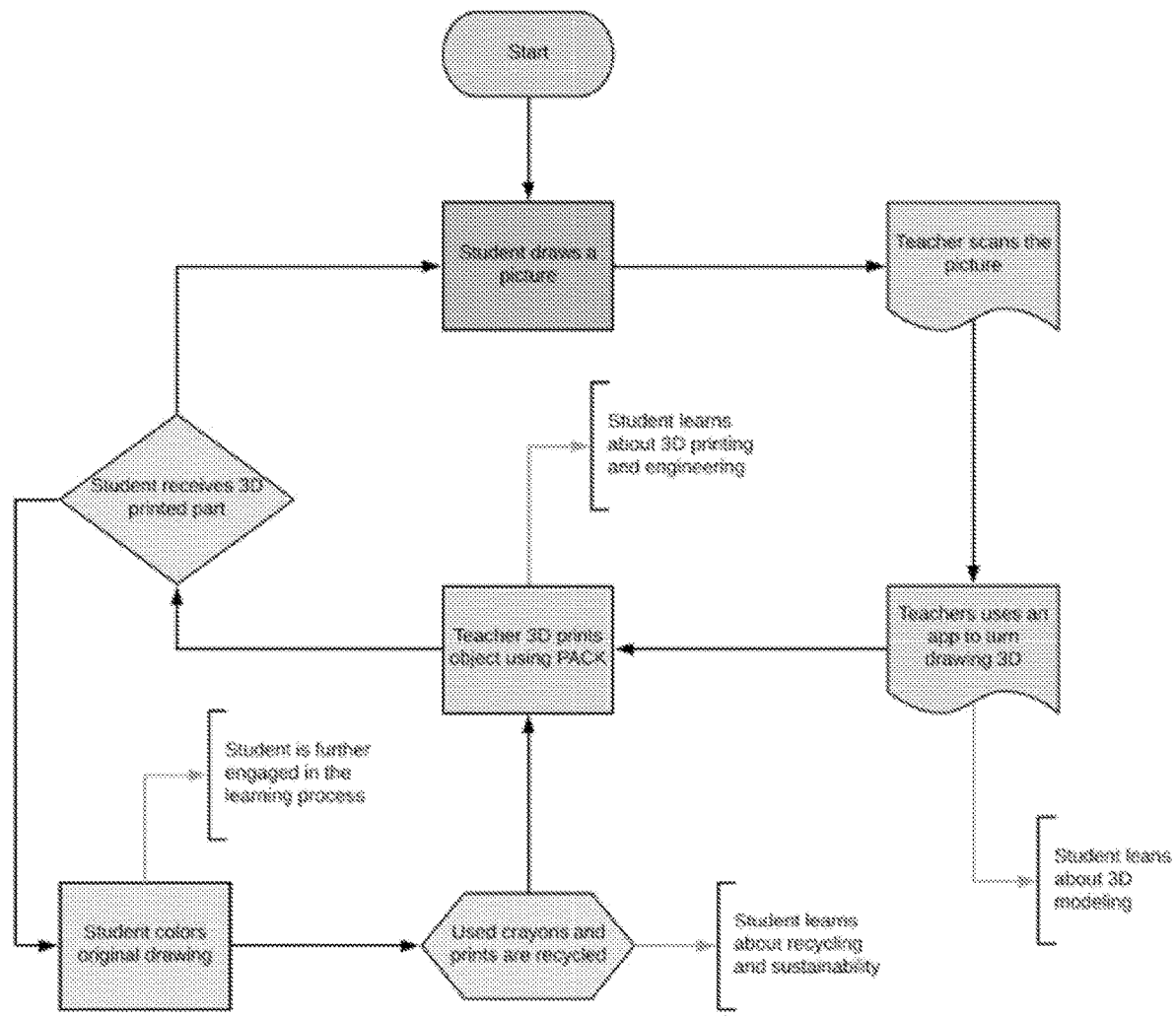

FIG. 13 is a flowchart of a possible learning process using the 3D printer system and remelter/recycler according to an illustrative embodiment.

DETAILED DESCRIPTION

It should be understood that in the following description, the use of terms such as X, Y, and Z axis, and front and rear are terms of convenience and may be altered without changing the substance of the invention. In the following embodiment, the X and Y axis will be controlled by motors, and the Z axis will be controlled by motion in the X and Y axis. It should be understood that this should also include but not be limited to: Using Y and Z axis to control the X axis, or using the X and Z axis to control the Y axis.

Figure 1:
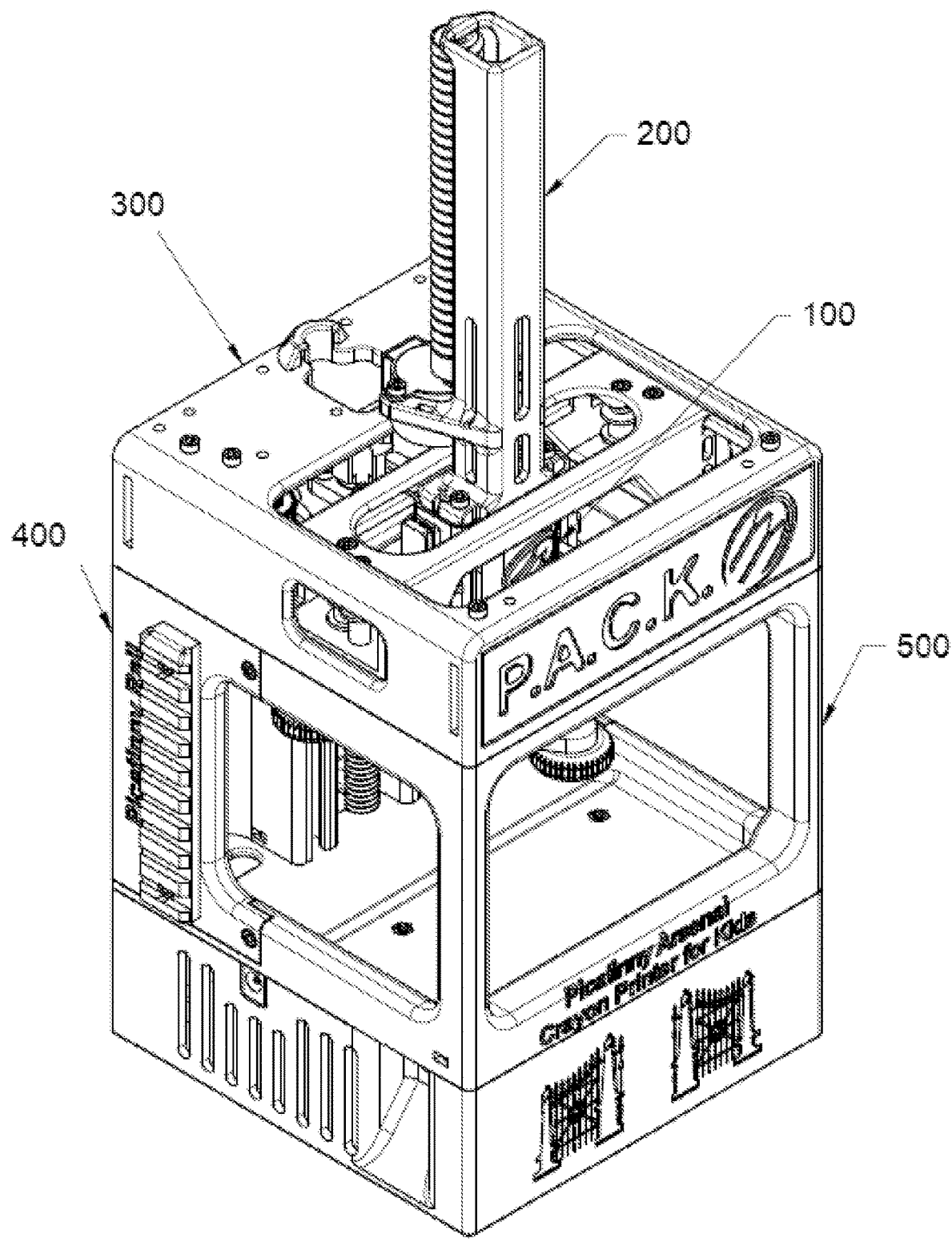
FIG. 1 depicts the full assembly of an embodiment of the 3D printer according to an illustrative embodiment.

FIG. 1 depicts the full assembly of an embodiment of the 3D printer according to an illustrative embodiment. Provided is a base of the 3D printer, which may contain the electronics, which may include a UL power supply and control system which may be an arduino uno clone or other PLC. Extending from the top of the base may be the part of the assembly which contains the z-axis mechanism (Z-Axis (400)). There may also be additional frame elements (Frame (500)) extending upwards from the base. On top of these elements, there may be attached an element which comprises means of control actuation in the X and Y axis (X/Y Axis (300)). The (X/Y Axis (300)) element may comprise rails which may run linearly front to back (this may be identified as the y-axis). Slidably attached to these y-axis rails may be an element which comprises rails running in the x-axis direction (X Bar (301)). The Hotend (100) printer head may be slidably attached to the x-axis rails of the X Bar (301). There are numerous means of achieving control of alignment in the X and Y axis known to the art. One advantageous means is by a system of belts and pulleys equivalent to the CoreXY Cartesian Motion Platform. (See Prior Art—CoreXY).

Passive Z-Axis Articulation

Figure 2:
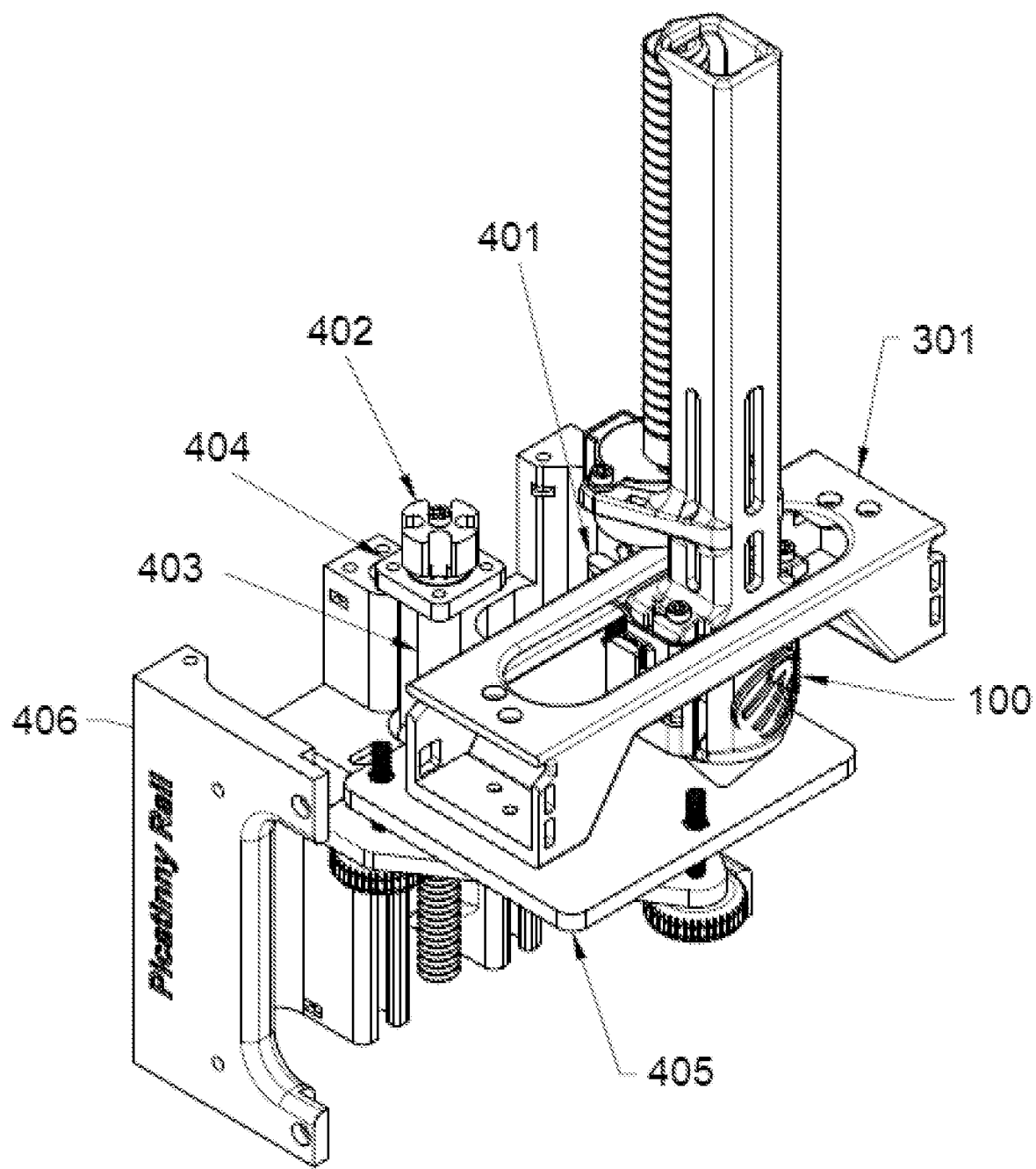
FIG. 2 depict the front ¾ internal view of the exemplary embodiment of the 3D printer, illustrating the z-axis assembly, which comprises the elements facilitating movement in the z-axis according to an illustrative embodiment.
Figure 3:
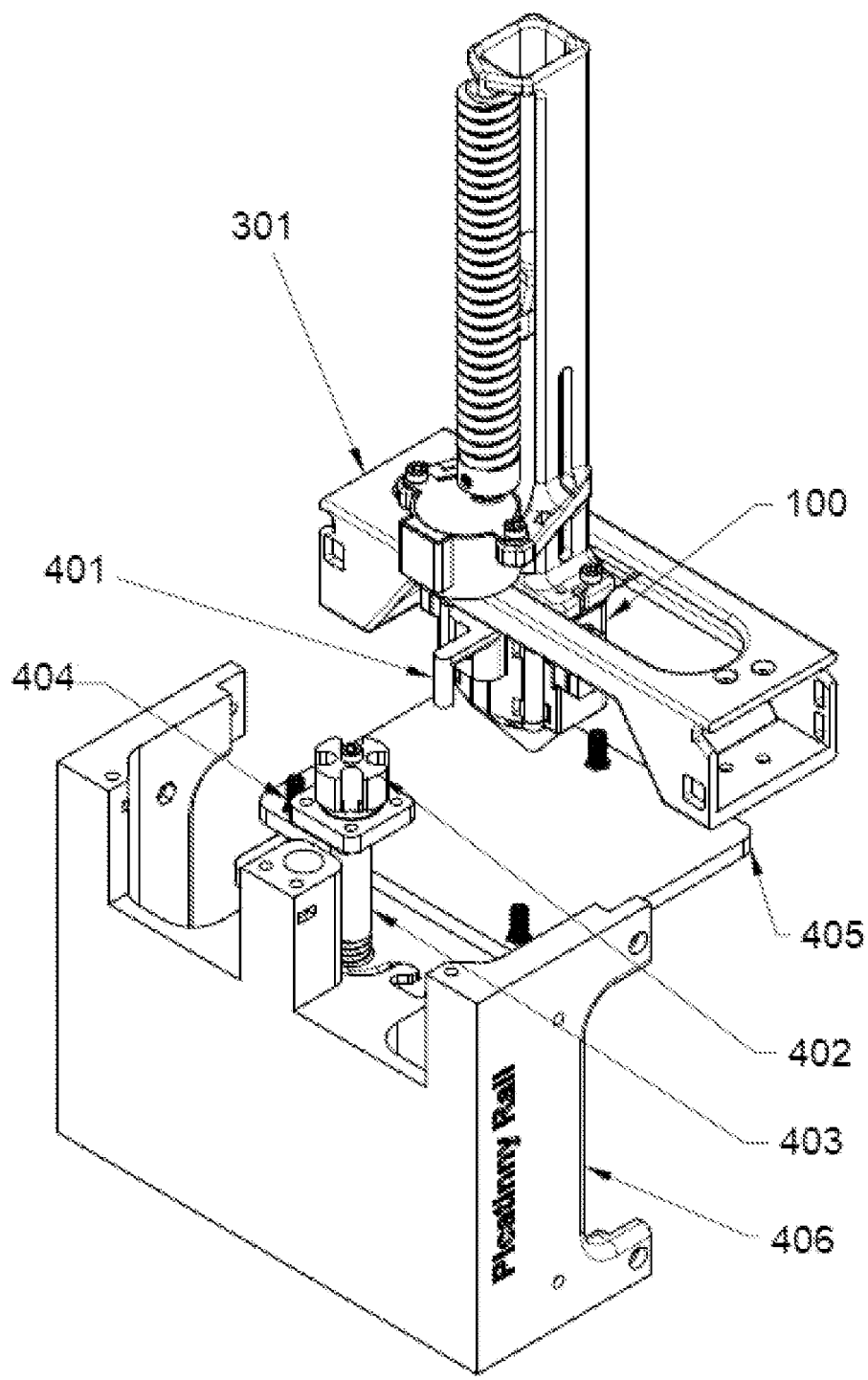
FIG. 3 depict the rear ¾ internal view of the exemplary embodiment of the 3D printer, illustrating the z-axis assembly, which comprises the elements facilitating movement in the z-axis according to an illustrative embodiment.
Figure 4:
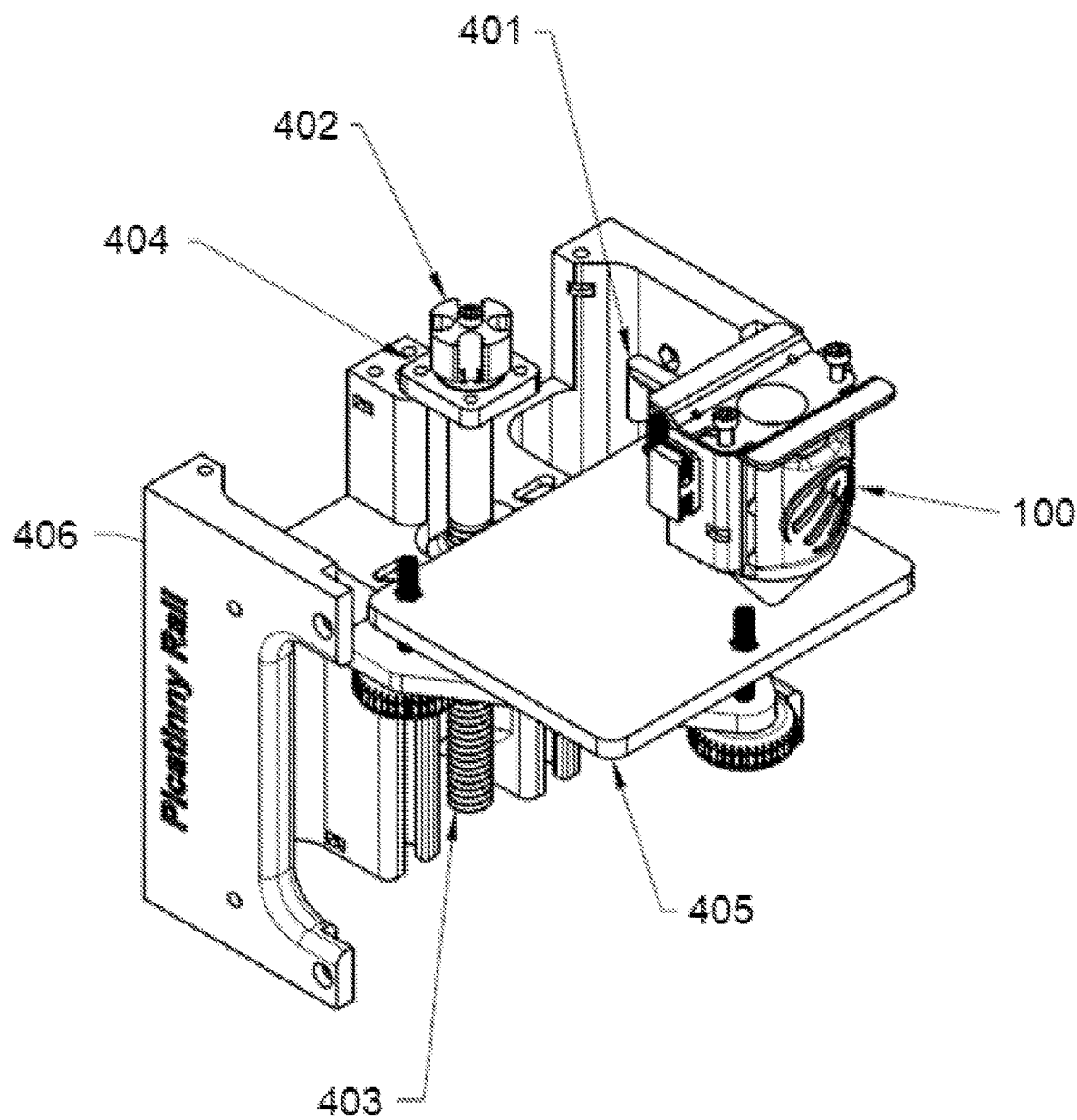
FIG. 4 depicts a front ¾ internal view of the exemplary embodiment of the 3D printer, illustrating the z-axis assembly, but with the x-bar omitted for clarity according to an illustrative embodiment.
Figure 5:
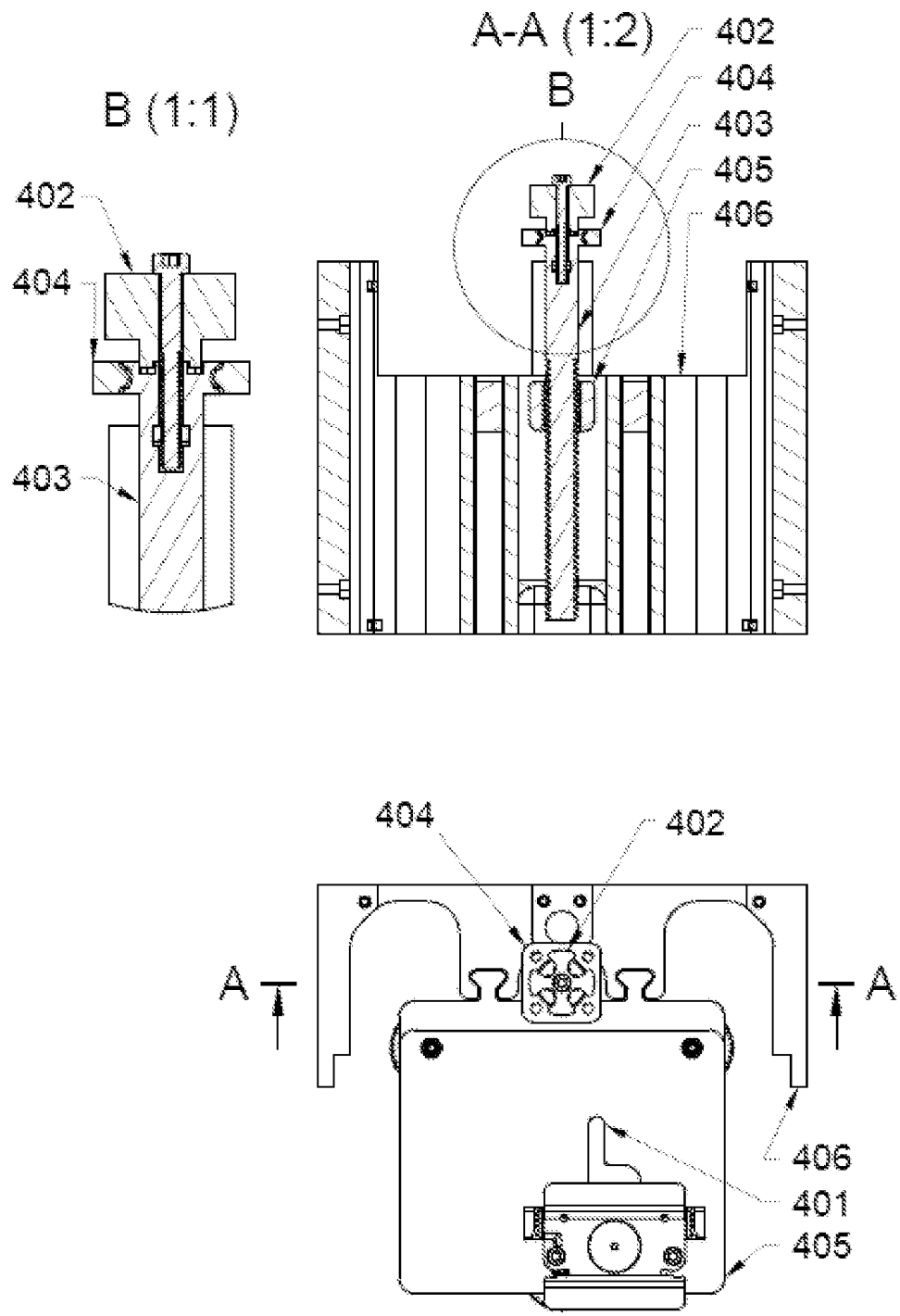
FIG. 5 is a sectional view of the z-axis assembly and shows the z-cam, screw mount, and z-screw according to an illustrative embodiment.
Figure 6:
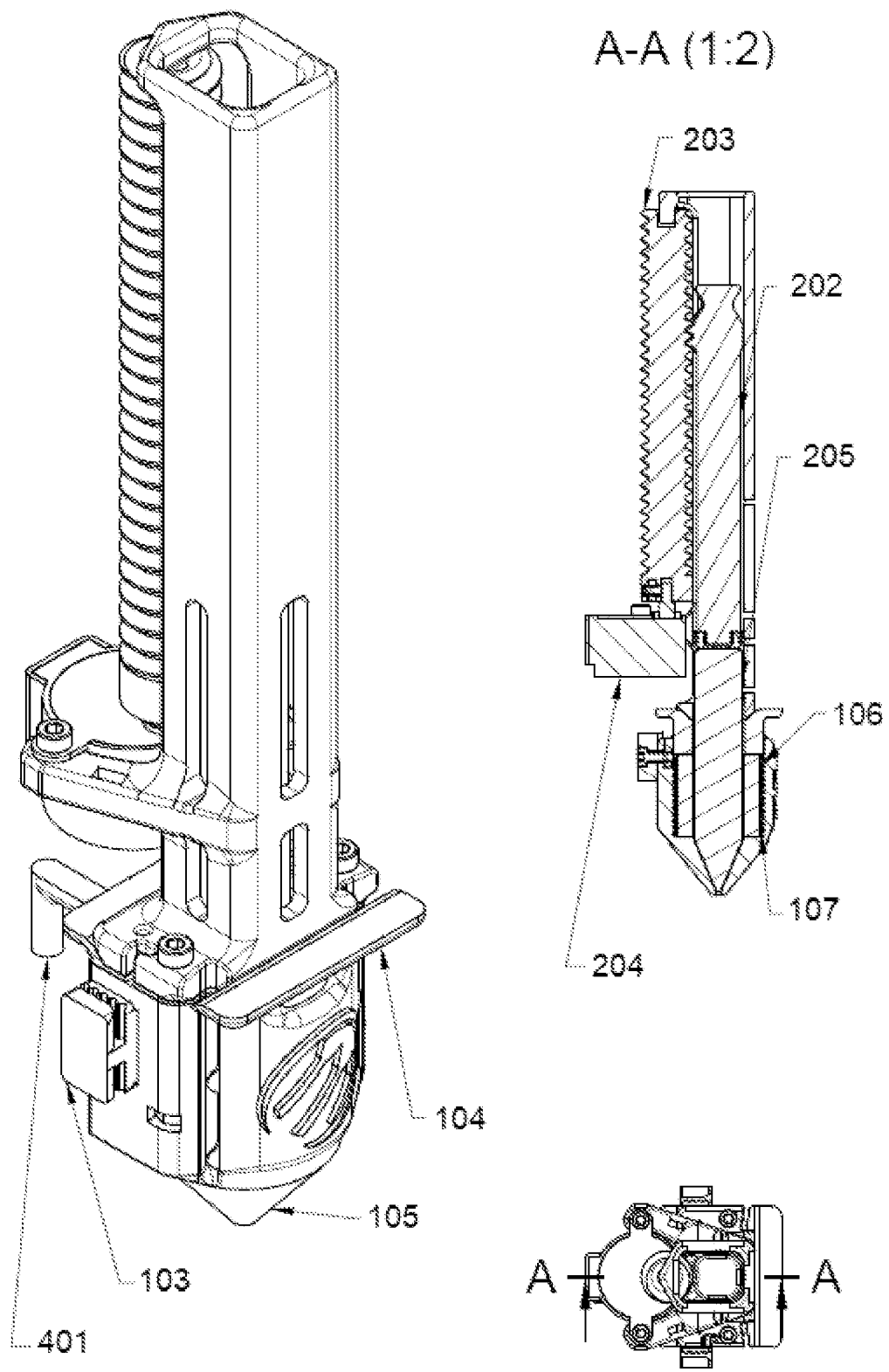
FIG. 6 depicts ¾ view and cutaway of the hotend and extruder and depicts the a crayon feedstock within the hotend according to an illustrative embodiment.
Figure 7:
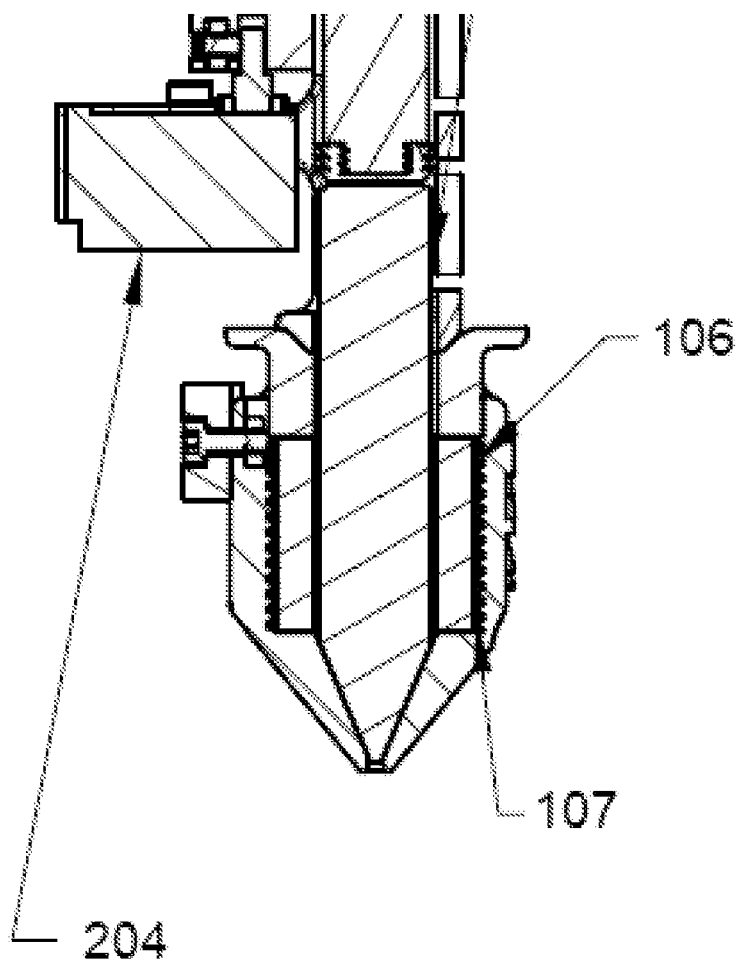
FIG. 7 is a cutaway view of the hotend with the nichrome heater coil and heater block according to an illustrative embodiment.

FIGS. 2 and 3 depict the internal view of the exemplary embodiment of the 3D printer, illustrating the Z Axis (400) assembly, which comprises the elements facilitating movement in the z-axis. The Z Frame (406) is the body structure which may be attached to the base (not depicted), and which extends upwards in the z direction. A Buildplate (405) is attached, slidably linearly in the z-axis, to the Z Frame (406). The Z frame (406) may have 1 or more rails or slides which may extend in the z-axis and which may slidably be engaged by elements on the buildplate, providing stability to the buildplate (405) as it moves in the z-axis. A Screw Mount (404) is provided at or near the top of the Z Frame (406), which may be separate or integral to the Z Frame (406). The Screw Mount (404) has a hole A lead screw may be provided, Z Screw (403) which is rotatably attached to the Z frame (406), and which extends axially in the z-axis and is substantially fixed in the z-axis. The Screw Mount (404) may advantageously be separate from the Z Frame as it may allow the Screw Mount (404) and, perhaps, the lead screw (Z Screw (403)), to be 3D printed as as a single print to be captive in the axial direction but where the Z Screw is free to rotate with respect the Screw Mount about the z axis. Such an embodiment may be seen in cross section in FIG. 5.

The Buildplate (405) has a threaded hole that mates with the Z Screw (403) and the motion is constrained by the Z Frame (406); the assembly acts as a linear stage system. After each layer is printed, the Hotend (100) moves towards the back of the machine and moves the Z Actuator (401) into a slot on a slotted cam, Z CAM (402) which may be bolted, coaxially to the end of the Z Screw (403). The tool-head then moves in a circular arc, rotating the Z CAM (402) and therefore the screw (for instance, one-quarter turn, in the case of a 4 slot cam) which lowers the buildplate. Finally the tool-head moves the Z Actuator (401) out of the Z CAM (402) to start the next layer. This system permits omission of a third motor and associated components such as the motor driver electronics, thus reducing the cost of the 3D printer, in such a way that substantially all of the elements which function to convert the XY motion to Z motion may be 3D printed out of thermoplastics.

Hotend Nozzle with Heater

To reduce the time needed to stabilize the temperature of the Hotend (100), given the comparatively large diameter of the stock working material being extruded, a wound wire heater coil (107) may be advantageously implemented, which will more evenly disperse heat over the hotend than typical cartridge heaters. This wound wire heater coil (107) may be comprised of a nichrome wire heating element (107). The gauge of wire may be determined by the required current load which may include a factor of safety and the number of wraps may be determined by the required total resistance to achieve the desired heater wattage.

In one possible embodiment the specs for the nichrome wire heater may be as follows:

1.055 ohm/ft
Desired wattage=40 W
Estimated resistance=3.6 ohm
Gauge—could be 20-24 AWG (American Wire Gauge)
Estimated length needed=3.412 ft=1040 mm
Circumference of interior=88.34 mm
Estimated number of wraps needed=11.77→12 wraps In an embodiment, the Hotend (100) may be comprised of the nozzle (105), a heater block (106), and a coil of nichrome wire (107) which is helically arranged about the outer surface of the heater block (106). While the nichrome wire may be wrapped around the heater block (106), in an embodiment, the coil of nichrome wire (107) may advantageously be attached to the interior surface of a part, which may be the nozzle (105), which may be adjacent to or may substantially surround the heater block (106). In an exemplary embodiment, threading may be introduced to the interior of the adjacent component which may hold the nichrome wire (107) in place, against the outside of the heater block (106) and to prevent the wire from shorting against itself. In order to properly wind the nichrome wire (107) into this helical channel a custom tool is provided (Threading tool (108)—FIG. 10.) It is advantageous, not only for the tool to allow for the winding of the nichrome but to be able to release from the nichrome wire (107) once it is embedded inside the housing and allow the tool to be removed. The nozzle (105) housing may have a removable section (Nozzle insert (110)), shown in FIG. 8. that, when removed, provides an opening or aperture, which allows for the disengagement of the nichrome wire (107) from the winding tool during assembly.

For safety, the nichrome wire (107) may be spliced into standard wire such that only standard wire is exposed outside the toolhead where said standard wire then leads to the control board. This way, the risk of being even very minorly burnt or electrocuted is eliminated. Either this spliced wire, or the nichrome wire (107), directly may be connected to the 3D printer electronics via connectors such as butt splice connectors (109). The nozzle (105) may be provided with means of retaining the butt splice connectors (109) by means such as zip ties which may be threaded through integral internal channels which may be included in the nozzle (105) during 3D printing. The butt splice connectors (109) may, while held in this position, in turn hold the nozzle insert (110) in the aperture.

To provide for a thermistor, a recess may be provided in the heater core which may be a drilled hole.

Embodiments of this design may provide sufficient thermal performance to reduce the heat up time to roughly 20 seconds, including time to stabilize.

Assembly Tool

One possible method of assembling a wire (107) coil within a threaded inner diameter of the nozzle (105) is with a threading tool (108), FIG. 10, that is substantially bolt shaped, and which might be configured for finger tightening with a handle (111) at the head end, a threaded body (112), and a hollow recess (113) in the end opposite the head. There may be a retaining hole (114) between the threaded exterior and the hollow recess near the end opposite the head.

The Nichrome Hotend Assembly Drawing, FIG. 8. depicts the use of the threading tool (108) in the threaded nozzle (105) after it has been used to thread the nichrome wire heater (107) into the nozzle (105) threads. The section view shows how the threading tool integrates with the internal body of the nozzle (105) and a detailed view shows a closer look about how the nichrome wire (107) sits between the tool and housing of the nozzle (105). The internal housing of the nozzle (105) contains a single-start thread which the nichrome can rest. The threading tool contains a double-start thread to allow both the nichrome wire (107) and the threaded nozzle (105) body to align with the tool.

The Nichrome wire (107) may be inserted in the retaining hole (112) and a length of it wrapped about one channel of the double start threaded exterior of the Assembly Tool (108). When the wire (107) is wrapped to substantially near the handle, the tool may be threaded into the threaded nozzle (105), while tension on the wire is maintained, such that the wire can thread into the single start thread in the nozzle.

Ideally, the Nichrome wire (107) has been stored on as spool or in such a way that the resting radius of the the wire is greater than the radius of the nozzle interior thread, such that the Nichrome wire (107) is predisposed to spring into the interior thread of the nozzle (105) once in place.

Again, the nozzle (105) may be provided with an aperture, such that, when the tool with wire (107) has been threaded into the nozzle (105), such that the retaining hole aligns with the aperture, the portion of the wire (107) which had been inserted in the Retaining hole may be drawn out through the aperture (perhaps with needle nose plyers) and which wire end may be attached via, for instance, a butt splice connector (109) to the wire leading to the control board. The aperture may be plugged by a nozzle insert, which may have a hole through which the Nichrome wire (107) may be threaded.

Feed Mechanism

A feed mechanism (Extruder (200)), FIG. 12, is provided which receives a feedstock which may be in the form of a wax crayon (205), and which feeds said feedstock into the nozzle (105). In one embodiment, the Extruder (200) is affixed to the top of the nozzel (105), such that the feedstock crayon (205) is oriented substantially axially vertically when loaded and which feedstock (205) may descend axially downward into the nozzle (105). The extruder (200) may be provided with a means to impart a force upon the feedstock (205) so that the feeding of the feedstock (205) into the nozzle (105) is controlled, and by doing so, control the volume and the rate of delivery of the melted material at the outlet of the nozzle (105). In a possible embodiment this may be achieved with a plunger like arrangement.

There may be a substantially tubular frame (Extruder Frame (201)) arranged substantially vertically and attached to the top of the nozzle (105) so that the hollow interior of the Extruder Frame (201) is aligned with and in communication with the hollow interior of the Nozzle (105). The Extruder Frame (201) my form a substantially circular channel extending vertically, but other channel shapes are contemplated such as a rounded square channel. The hollow interior of the Extruder frame (201) is sized to accept a feedstock crayon (205), while being longer in the axial direction to accommodate a portion of a plunger like element, the Extruder Rack (202). The Extruder Rack (202) is a substantially cylindrical rod like element, arranged to slide within the vertical channel of the Extruder Frame (201).

There may be a helical worm (Extruder Worm (203)) arranged beside and with its axis parallel to the axis Extruder Frame (201) and Extruder Rack (202). The Extruder rack (202) may further comprise an element such as teeth to engage the extruder worm (203). The Extruder Rack (202) may have a slot along a portion of its length through which the teeth may protrude and engage the extruder worm (203). The slot is sized to allow the teeth to engage the worm as the Extruder rack (202) rises and descends in the Extruder frame (201). The Extruder Worm (203) may be turned by a motor which may be a Unipolar Stepper (204). As the unipolar stepper (204) turns it turns the Extruder worm (203), and via the engaged teeth, the Extruder Rack (202) is moved either up or down within the Extruder Frame (201).

The Extruder rack (202) may be raised by this means until the teeth reach the upper end of the Extruder worm (203) and become disengaged from the Extruder worm (203). The Extruder rack (202) may be extracted free of the Extruder frame (201) and a feedstock crayon (205) may be inserted. The Extruder rack (202) may be reinserted and the teeth allowed to rest on the Extruder worm (203). The Stepper motor (204) may be turned such that the Extruder worm (203) engages the teeth and causes the Extruder rack (202) to move downward toward the feedstock crayon (205). When the Extruder Rack (202) contacts the feedstock crayon (205) and continues downward, it feeds the feedstock crayon (205) through the nozzle (105). Selectively controlling the motor (204) controls the volume and rate of delivery of the melted material at the outlet of the nozzle (105). This contemplated embodiment has an additional advantage of having the major elements of the extruder (200) be 3D printable out of standard thermoplastics including the Extruder frame (201), Extruder Rack (202), and Extruder worm (203).

Crayon Feedstock Recycler

A school appropriate system of recycling crayon wax into suitably formed additional feedstock is also provided, which may be placed in a conventional microwave to provide heat and which recycling system (500) comprises a mold (501) to form a feedstock crayon, oriented axially vertically, from the recycled crayon wax, and which is held within a vessel or cup (502), which cup (502) may be filled with water. As the water is heated by the microwave, it warms the mold and melts the contained wax. The mold may have an opening at the top to receive the crayon wax to be recycled and may further comprise a funnel or similar structure extending from the top opening of the mold to better received the wax to be melted and channel it into the mold as it melts. The mold (501) may, advantageously be divided along its length in 2 or more pieces to allow for easy removal of the reformed wax crayon. Mold (501) pieces may be held together by screws (504) or other means. A gasket (503) may be provided between molds (501) to prevent leakage of the melting wax, and also to prevent leakage of the water into the mold. Alternate embodiments may be arranged with a plurality of molds so more than one reformed wax crayon may be reformed at the same time. Temperature indication means, such as thermochromic tape, may be a feature of the recycler (500) to indicate temperature of the contents.

System Overall

It is contemplated that the 3D printing system contemplated herein be usable in an elementary school classroom environment, and that it assist in learning several aspects of modeling and engineering. The 3D models to be printed by a 3D printer may be generated in whole or in part by a student themselves. Novice students may provide a 2D drawing to the teacher, who may scan the image and convert the provided drawing into a 3D model while teaching the students about 3D modeling. The resulting 3D model may be 3D printed using the 3D printer described herein, out of safe, low temperature melt crayon wax, demonstrating 3D printing to the students. The students may be encouraged to use their new crayon wax 3D model to color in their original 2D drawing. Old models, scrap pieces and broken crayon pieces may be remolded using the described recaster/recycler to provide additional feedstock, which teaches the students about recycling and sustainable engineering. As the students advance they may be able to generate their own 3D models. Also, more advanced students may be provided with only the non-3D printable elements of the PACK 3D printer and 3D computer models for the printable parts and be assigned to print and assemble the full working printer.

What is claimed is:

1. A 3D printer system comprising:
   a hotend print head, which may be moved in an x and y axes using a pair of motors;
   a gearless passive z-axis alignment system, wherein said passive z-axis alignment system converts motion in the x and y axes of said hotend print head into a motion in a z-axis wherein said gearless passive z-axis alignment system is comprised of:
   a z-frame body structure which has a top;
   a buildplate which is attached, slidably in the z-axis, to the z-frame body structure;
   a screw mount which is provided proximate the top of the z-frame body structure and which screw mount has a screw mount hole in the direction of the z-axis;
   a z-screw which is a threaded lead screw, oriented in the z-axis and which is attached, rotatably about the z-axis and fixed translatably in the z-axis, to the z-frame body structure, at the screw mount, through the screw mount hole;
   wherein said buildplate has a threaded hole through which the z-screw is threaded;
   a z-cam which is a substantially circular cam with a plurality of cam slots about its circumference, and which z-cam is fixedly attached co-axially at the top of the z-screw;
   a z-actuator which is a substantially cylindrical pin fixedly attached to the hotend print head and which z-actuator is axially oriented in the z-axis;
   wherein by movement of the hotend print head in the x and y axes, said z-actuator may enter one of said cam slots;

wherein as the hotend print head and fixedly attached the z-actuator is moved in a circular path via motion in the x and y axes, such that the z-actuator traces a circular path about the z-screw z-axis, the z-screw may be rotated about its z-axis;

wherein said rotation of the z-screw causes the buildplate to translate in the z-axis via the threaded hole.

2. The 3D printer system of claim 1, wherein said hotend print head is designed to heat large diameter feedstock at uniform low temperature, and is further comprised of:

a nozzle which is a hollow substantially cylindrical body, axially oriented with the z-axis, a top, a bottom and an inside surface;

wherein said inside surface has helical threads;

a heater block which is a hollow substantially cylindrical body, axially oriented with the z-axis and which has an outside surface;

a wound wire heater coil arranged in the helical threads of the inside surface of the nozzle;

wherein said heater block is positioned coaxially within the nozzle and said heater block outside surface is in contact with the helical threads and wound wire heater coil.

3. The 3D printer system of claim 2, which includes an extruder feed mechanism adapted to receive a feedstock which may be in the form of a wax crayon, wherein said extruder feed mechanism comprises:

an extruder frame, which is a generally tubular receptacle, axially in-line with and attached to the top of the nozzle, and which extruder frame has an interior which is sized to accommodate a wax crayon, and which extruder frame has an opening on at least one side along a portion of its length;

an extruder worm, which is a helical lead screw and which is mounted, rotatably about its long axis, axially parallel to said extruder frame along said opening on the extruder frame, and which extruder worm has a top;

an extruder rack, which is a substantially rod-shaped element which may move up and down within said extruder frame, and which has one or more teeth which may engage said extruder worm;

a stepper motor, which rotates said extruder worm about its axis;

wherein said rotation of the extruder worm may cause to raise or lower the extruder rack in the extruder frame;

wherein if the extruder rack is lowered it may press down on a contained wax crayon;

wherein the extruder rack may be removed from the extruder frame if the extruder rack is raised such that the teeth rise above the top of the extruder worm.

4. The 3D printer system of claim 2, wherein said wound wire heater coil is a nichrome wire.

* * * * *